United States Patent
Watanabe et al.

(10) Patent No.: US 7,883,814 B2
(45) Date of Patent: Feb. 8, 2011

(54) FUEL CELL SEPARATOR WITH INTEGRAL SEAL MEMBER

(75) Inventors: Yasuhiro Watanabe, Kawaguchi (JP); Masaaki Sakano, Utsunomiya (JP); Shuji Sato, Utsunomiya (JP); Shigeru Inai, Shioya-gun (JP); Teruyuki Ohtani, Haga-gun (JP); Ken Takahashi, Shimotsuga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 328 days.

(21) Appl. No.: 12/012,456

(22) Filed: Feb. 1, 2008

(65) Prior Publication Data

US 2008/0187812 A1    Aug. 7, 2008

(30) Foreign Application Priority Data

Feb. 1, 2007    (JP) .............................. 2007-023172

(51) Int. Cl.
| | |
|---|---|
| H01M 8/24 | (2006.01) |
| H01M 2/38 | (2006.01) |
| H01M 2/40 | (2006.01) |
| H01M 2/20 | (2006.01) |
| H01M 2/08 | (2006.01) |
| H01M 2/14 | (2006.01) |

(52) U.S. Cl. .................. 429/460; 429/452; 429/457; 429/469; 429/508

(58) Field of Classification Search .................. 429/34, 429/460, 452, 457, 469, 508
See application file for complete search history.

(56) References Cited

U.S. PATENT DOCUMENTS 7,014,939 B2    3/2006    Suenaga et al.

FOREIGN PATENT DOCUMENTS

JP    2002-305006    10/2002

*Primary Examiner*—Patrick Ryan
*Assistant Examiner*—Julian Mercado
(74) *Attorney, Agent, or Firm*—Nelson Mullins Riley & Scarborough LLP; Anthony A. Laurentano

(57) ABSTRACT

A first metal separator of a fuel cell comprises a metal plate, and a first seal member is formed integrally on both surfaces of an outer edge of the metal plate. A first rib having a frame shape is provided around an oxygen-containing gas supply passage or the like of the metal plate. The first rib has a rib surface spaced away from an inner end surface of the metal plate around the oxygen-containing gas supply passage or the like, toward the oxygen-containing gas supply passage or the like.

5 Claims, 5 Drawing Sheets

FIG. 3
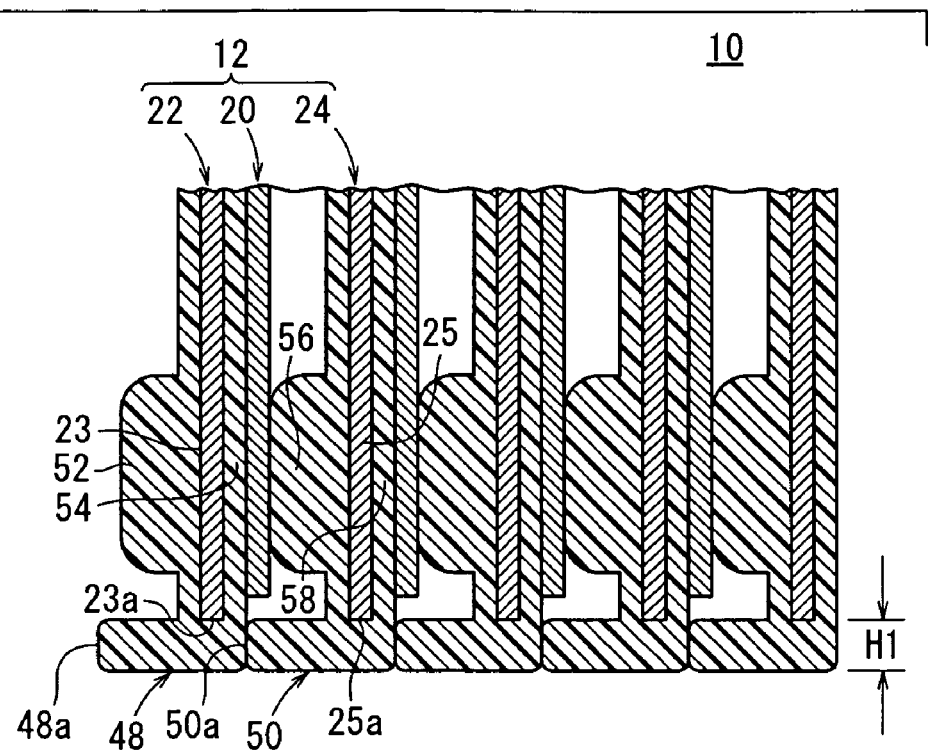
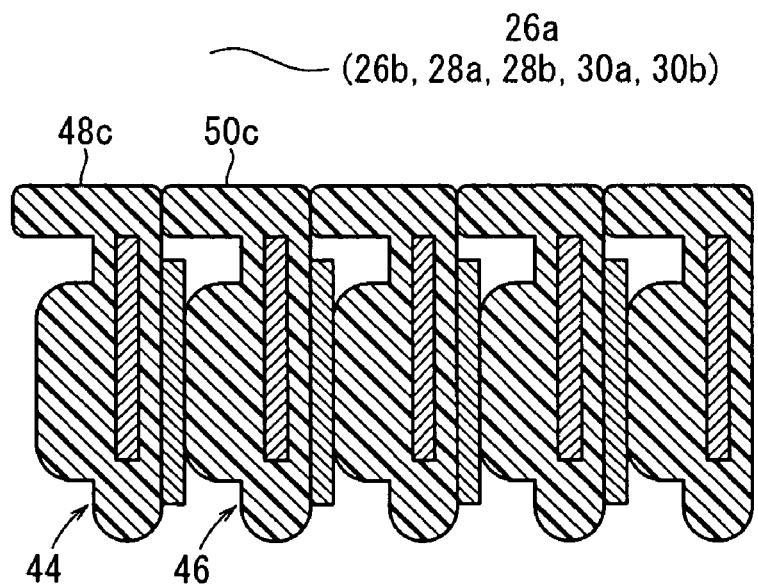

FIG. 4
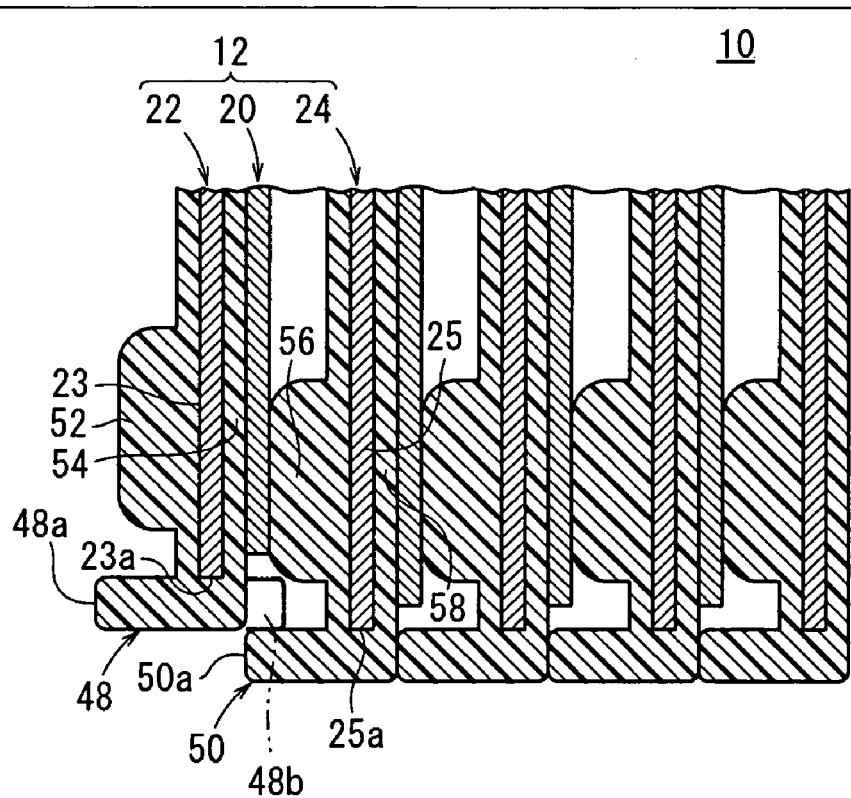
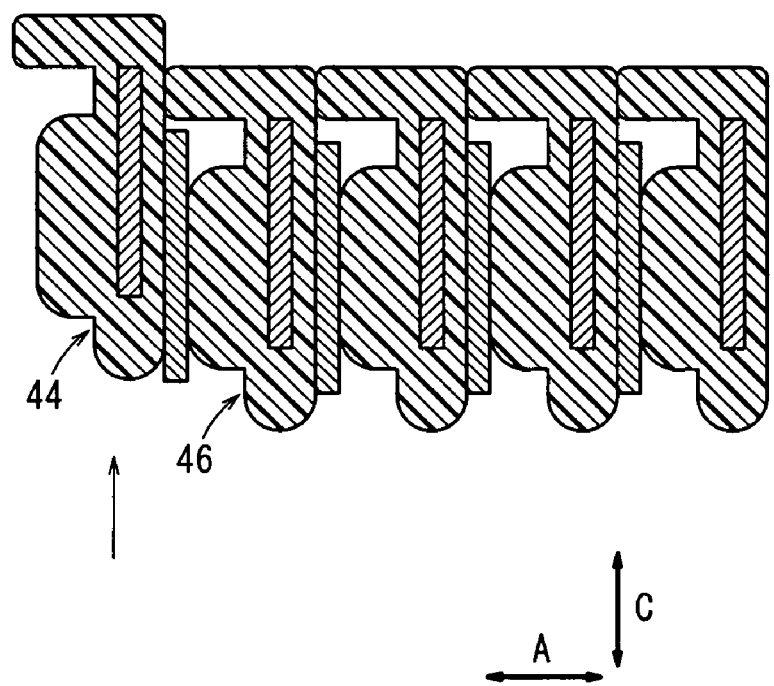

FUEL CELL SEPARATOR WITH INTEGRAL SEAL MEMBER

BACKGROUND OF THE INVENTION

1. Field of the Invention

The present invention relates to a fuel cell formed by stacking an electrolyte electrode assembly and a separator in a stacking direction. The electrolyte electrode assembly includes a pair of electrodes and an electrolyte interposed between the electrodes. A passage extends through the fuel cell in the stacking direction for allowing at least a reactant gas or a coolant to flow in the stacking direction.

2. Description of the Related Art

For example, a polymer electrolyte fuel cell employs an electrolyte membrane (electrolyte). The electrolyte membrane is a polymer ion exchange membrane. A membrane electrode assembly includes an anode, a cathode, and the electrolyte membrane interposed between the anode and the cathode. Each of the anode and the cathode includes an electrode catalyst and porous carbon. The membrane electrode assembly and separators (bipolar plates) sandwiching the membrane electrode assembly make up a unit of a fuel cell (power generation cell) for generating electricity.

In the fuel cell, a flow field for allowing a fuel gas (hereinafter also referred to as the reactant gas) to flow along the anode is formed on a separator surface facing the anode, and a flow field for allowing the oxygen-containing gas (hereinafter also referred to as the reactant gas) to flow along the cathode is formed on a separator surface facing the cathode. Further, a flow field for allowing a coolant to flow between the separators is formed in each of the power generation cells, or in every predetermined number of the power generation cells.

In the structure, it is necessary to reliably seal the flow fields for preventing the fuel gas, the oxygen-containing gas, and the coolant from being mixed together, and preventing entry of foreign material into the flow fields, or short-circuiting between the separators. For this purpose, various sealing structures are adopted.

In the normal sealing structure, if the sealing material or the membrane electrode assembly is contracted due to the change in temperature, or deterioration over time in the stacking direction of the separators, gaps are formed between the separators and the sealing material. As a result, entry of foreign material, or degradation of the power generation performance or the like may occur easily. In an attempt to address the problem, in a known fuel cell disclosed in Japanese Laid-Open Patent Publication No. 2002-305006, insulating members are provided around passages formed in separators.

Specifically, as shown in FIG. 5, the separators 1 and membrane electrode assemblies (not shown) are stacked alternately, and a passage 2 extends through the separators 1 in a stacking direction for allowing the reactant gas or the coolant to flow through the passage 2.

Each of the separators 1 is formed into one piece using stainless steel plate or the like. Sealing members 3 are formed integrally with the separators 1. Annular insulating members 4 are provided around the passage 2. In the structure, the insulating members 4 effectively prevent electrical short-circuiting between the separators 1 and degradation in the sealing performance due to entry of foreign material when spacing between the separators 1 is increased, or due to deterioration over time.

The seal height of the sealing member 3 in the stacking direction may be reduced over time. Thus, the insulating member 4 is compressed easily in the stacking direction. In the conventional technique, an inner edge la of the separator 1 around the passage 2 is provided in a range H where the adjacent insulating members 4 contact each other.

When the insulating member 4 is compressed, the metal inner edge la is not deformed elastically. Therefore, the elastic coefficient in the vicinity thereof becomes large. Thus, by the decrease in the compression load applied to the insulating member 4, the sealing line pressure (compression load per unit length of the seal) is reduced, and the sealing performance may be degraded undesirably. Further, an elastic deformation amount varies between a portion of the insulating member 4 where the inner edge la is present and the other portion of the insulating member 4. Therefore, the sealing performance may be degraded undesirably.

SUMMARY OF THE INVENTION

The present invention has been made to solve the problem, and an object of the present invention is to provide a fuel cell which is not affected by changes in the seal height, while maintaining the sealing performance around passages, and allowing the fuel cell to be used suitably for a long period of time.

The present invention relates to a fuel cell formed by stacking an electrolyte electrode assembly and a separator in a stacking direction. The electrolyte electrode assembly includes a pair of electrodes and an electrolyte interposed between the electrodes. A passage extends through the separator for allowing at least a reactant gas or a coolant to flow in the stacking direction.

The separator comprises a metal plate with a seal member integrally formed on both surfaces of an outer edge of the metal plate. A rib having a frame shape is provided on the metal plate around the passage.

The rib has a rib surface which contacts another separator adjacent to the separator in the stacking direction. The rib surface is spaced away from an inner end surface of the metal plate around the passage, toward the passage.

In the present invention, since the metal plate is not sandwiched between the ribs in the stacking direction, even if the seal height of the seal member is reduced, e.g., due to deterioration over time, the compression ratio in the rib is small. Thus, it is possible to suitably prevent the line pressure applied to the rib from being increased, and thus it is possible to prevent the line pressure applied to the sealing member from reducing. Accordingly, the desired sealing performance around the passage is maintained, and the seal member can be used suitably for a long period of time.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a cross sectional view showing main components of the fuel cell;

FIG. 4 is a cross sectional view showing operation of the fuel cell; and

DESCRIPTION OF THE PREFERRED EMBODIMENTS

Figure 1:
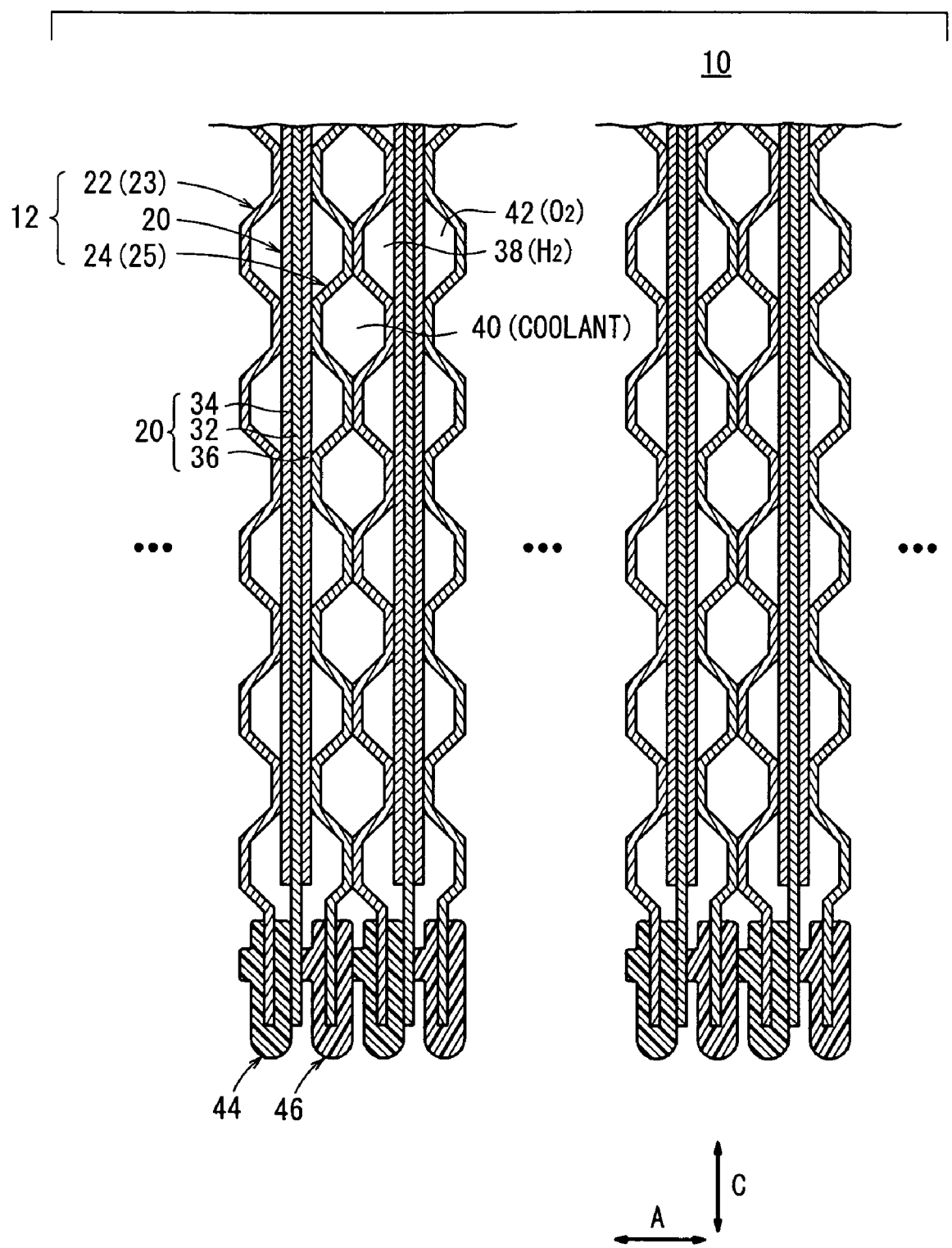
FIG. 1 is a partial cross sectional side view showing a fuel cell according to an embodiment of the present invention.
Figure 2:
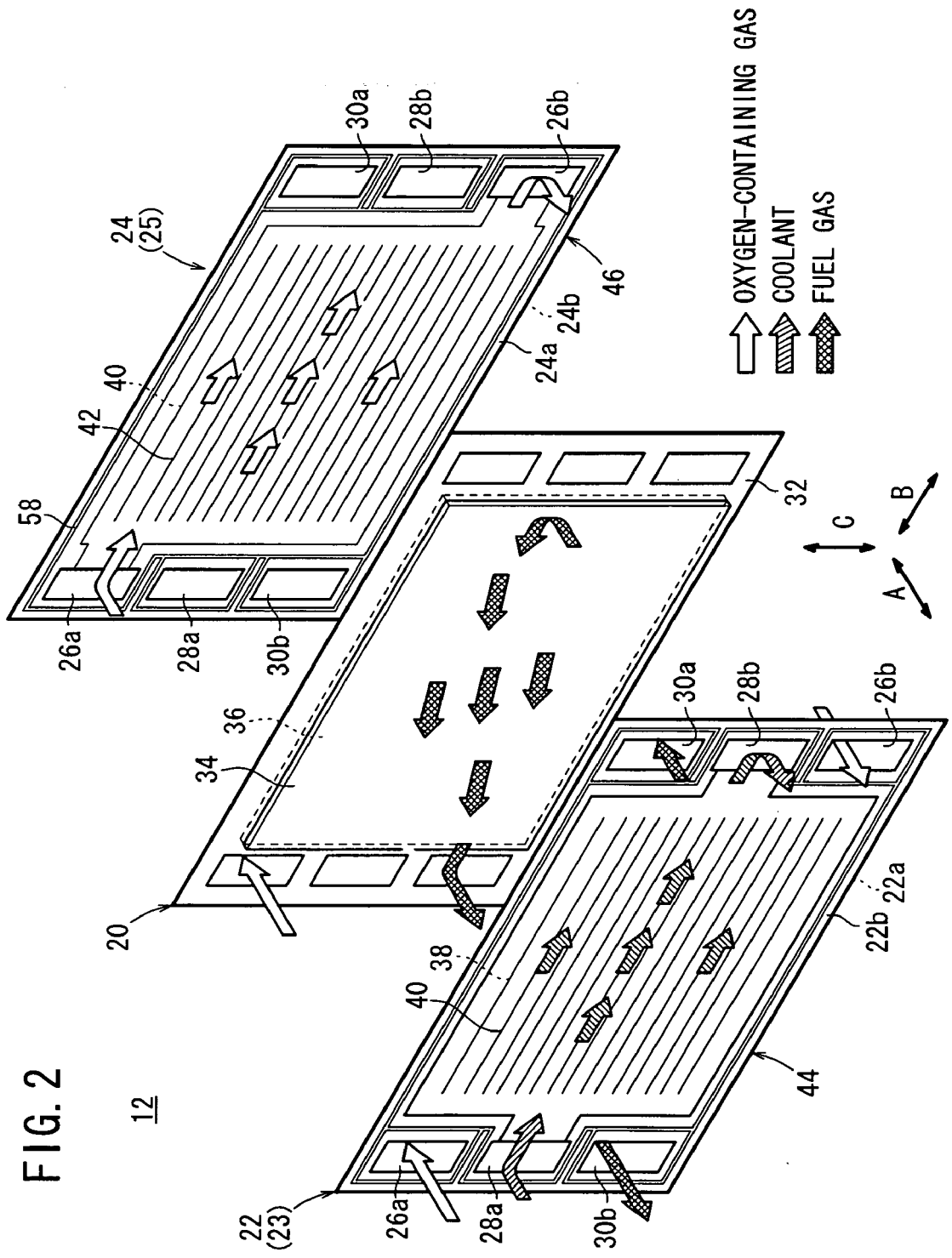
FIG. 2 is a partial exploded perspective view showing a power generation cell of the fuel cell.
Figure 5:
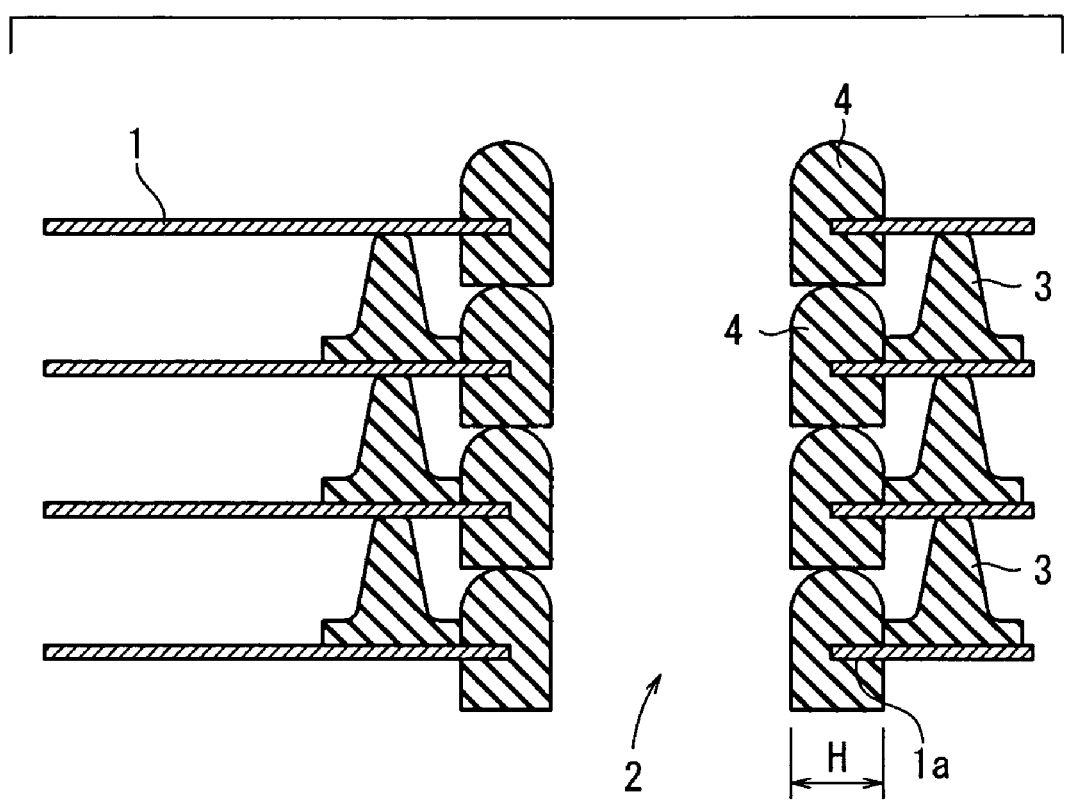
FIG. 5 is a cross sectional view showing a conventional fuel cell.

FIG. 1 is a partial cross sectional side view showing a fuel cell 10 according to an embodiment of the present invention, and FIG. 2 is a partial exploded perspective view showing a power generation cell 12 of the fuel cell 10.

In the fuel cell 10, a plurality of power generation cells 12 are stacked horizontally in a direction indicated by an arrow A. As shown in FIG. 2, the power generation cell 12 includes a membrane electrode assembly (electrolyte electrode assembly) 20 and first and second metal separators 22, 24 sandwiching the membrane electrode assembly 20. The first and the second metal separators 22, 24 are made of metal plates 23, 25, respectively. Each of the first and the second metal separators 22, 24 is fabricated in a corrugated shape or a dimpled shape under pressure to have ridges and recesses in cross section (see FIGS. 1 and 2).

At one end of the power generation cell 12 in a longitudinal direction indicated by an arrow B in FIG. 2, an oxygen-containing gas supply passage 26a for supplying an oxygen-containing gas, a coolant supply passage 28a for supplying a coolant, and a fuel gas discharge passage 30b for discharging a fuel gas such as a hydrogen-containing gas are provided. The oxygen-containing gas supply passage 26a, the coolant supply passage 28a, and the fuel gas discharge passage 30b extend through the power generation cell 12 in the direction indicated by the arrow A.

At the other end of the power generation cell 12 in the longitudinal direction, a fuel gas supply passage 30a for supplying the fuel gas, a coolant discharge passage 28b for discharging the coolant, and an oxygen-containing gas discharge passage 26b for discharging the oxygen-containing gas are provided. The fuel gas supply passage 30a, the coolant discharge passage 28b, and the oxygen-containing gas discharge passage 26b extend through the power generation cell 12 in the direction indicated by the arrow A.

The membrane electrode assembly 20 includes an anode 34, a cathode 36, and a solid polymer electrolyte membrane 32 interposed between the anode 34 and the cathode 36. The solid polymer electrolyte membrane 32 is formed by impregnating a thin membrane of perfluorosulfonic acid with water, for example.

Each of the anode 34 and the cathode 36 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 34 and the electrode catalyst layer of the cathode 36 are fixed to both surfaces of the solid polymer electrolyte membrane 32, respectively.

The first metal separator 22 has a fuel gas flow field 38 on its surface 22a facing the membrane electrode assembly 20. The fuel gas flow field 38 is connected to the fuel gas supply passage 30a at one end, and connected to the fuel gas discharge passage 30b at the other end. The fuel gas flow field 38 includes a plurality of grooves extending in the direction indicated by the arrow B, for example. Further, the first metal separator 22 has a coolant flow field 40 on the other surface 22b. The coolant flow field 40 is connected to the coolant supply passage 28a at one end, and connected to the coolant discharge passage 28b at the other end. The coolant flow field 40 includes a plurality of grooves extending in the direction indicated by the arrow B.

The second metal separator 24 has an oxygen-containing gas flow field 42 on its surface 24a facing the membrane electrode assembly 20. The oxygen-containing gas flow field 42 is connected to the oxygen-containing gas supply passage 26a at one end, and connected to the oxygen-containing gas discharge passage 26b at the other end. The oxygen-containing gas flow field 42 includes a plurality of grooves extending in the direction indicated by the arrow B. The other surface 24b of the second metal separator 24 is stacked on the surface 22b of the adjacent first metal separator 22. When the first metal separator 22 and the second metal separator 24 are stacked together, the coolant flow field 40 is formed between the surface 22b of the first metal separator 22 and the surface 24b of the second metal separator 24.

A first seal member 44 is formed integrally on the surfaces 22a, 22b of the first metal separator 22 around the outer end of the first metal separator 22. On the surface 22a, the first seal member 44 is formed around the fuel gas supply passage 30a, the fuel gas discharge passage 30b, and the fuel gas flow field 38 for preventing leakage of the fuel gas, while allowing the fuel gas to flow between the fuel gas supply passage 30a and the fuel gas flow field 38, and between the fuel gas flow field 38 and the fuel gas discharge passage 30b. Further, on the surface 22b, the first seal member 44 is formed around the coolant supply passage 28a, the coolant discharge passage 28b, and the coolant flow field 40 for preventing leakage of the coolant, while allowing the coolant to flow between the coolant supply passage 28a and the coolant flow field 40, and between the coolant flow field 40 and the coolant discharge passage 28b.

A second seal member 46 is formed integrally on the surfaces 24a, 24b of the second metal separator 24 around the outer end of the second metal separator 24. On the surface 24a, the second seal member 46 is formed around the oxygen-containing gas supply passage 26a, the oxygen-containing gas discharge passage 26b, and the oxygen-containing gas flow field 42 for preventing leakage of the oxygen-containing gas, while allowing the oxygen-containing gas to flow between the oxygen-containing gas supply passage 26a and the oxygen-containing gas flow field 42, and between the oxygen-containing gas flow field 42 and the oxygen-containing gas discharge passage 26b. Further, on the surface 24b, the second seal member 46 is formed around the coolant supply passage 28a, the coolant discharge passage 28b, and the coolant flow field 40 for preventing leakage of the coolant while allowing the coolant to flow between the coolant supply passage 28a and the coolant flow field 40, and between the coolant flow field 40 and the coolant discharge passage 28b.

As shown in FIG. 3, a first rib 48 having a frame shape such as a flanged edge is formed on the first metal separator 22 around the oxygen-containing gas supply passage 26a, the oxygen-containing gas discharge passage 26b, the coolant supply passage 28a, the coolant discharge passage 28b, the fuel gas supply passage 30a, and the fuel gas discharge passage 30b (hereinafter also referred to as the oxygen-containing gas supply passage 26a or the like). Likewise, a second rib 50 having a frame shape such as a flanged edge is formed on the second metal separator 24 around the oxygen-containing gas supply passage 26a or the like.

The first rib 48 of the first metal separator 22 has a rib surface 48a which contacts a planar surface of the second rib 50 of the second metal separator 24 (other separator) adjacent to the first metal separator 22 in the stacking direction. The rib surface 48a is spaced away from an inner end surface 23a of the metal plate 23 around the oxygen-containing gas supply passage 26a or the like, toward the oxygen-containing gas supply passage 26a or the like. That is, the inner end surface 23a of the metal plate 23 terminates at a position spaced away from the oxygen-containing gas supply passage 26a or the like at least by the distance corresponding to the rib width H1 of the first rib 48.

The first seal member 44 has a ridge seal 52 at a position around at least the oxygen-containing gas supply passage 26a or the like on one surface of the metal plate 23, i.e., only on the side where the first rib 48 is provided. The first seal member 44 has a planar seal 54 on the other surface of the metal plate 23, on the side where the first rib 48 is not provided.

As in the case of the first rib 48, the second rib 50 of the second metal separator 24 has a rib surface 50a which contacts a planar surface of the first rib 48 of the first metal separator (other separator) adjacent to the second metal separator 24 in the stacking direction. The rib surface 50a is spaced away from an inner end surface 25a of the metal plate 25 around the oxygen-containing gas supply passage 26a or the like, toward the oxygen-containing gas supply passage 26a or the like.

The inner wall surface 48c of the first rib 48 forming the oxygen-containing gas supply passage 26a or the like is contiguous with the inner wall surface 50c of the adjacent second rib 50 forming the oxygen-containing gas supply passage 26a or the like, and these inner wall surfaces 48c, 50c form a flat surface.

The second rib 50 is provided only on one surface of the metal plate 25. The second seal member 46 has a ridge seal 56 only on one surface of the metal plate 25 where the second rib 50 is provided. The second seal member 46 has a planar seal 58 on the other surface of the metal plate 25.

The first rib 48 and the first seal member 44 may be made of the same material, and may be formed integrally with the metal plate 23. Further, the second rib 50 and the second seal member 46 may be made of the same material, and may be formed integrally with the metal plate 25.

Next, operation of the fuel cell 10 will be described.

In the fuel cell 10, as shown in FIG. 2, an oxygen-containing gas is supplied to the oxygen-containing gas supply passage 26a. A fuel gas such as a hydrogen-containing gas is supplied to the fuel gas supply passage 30a. Further, a coolant such as pure water, or an ethylene glycol is supplied to the coolant supply passage 28a. Thus, the oxygen-containing gas, the fuel gas, and the coolant are supplied to each of the power generation cells 12. The oxygen-containing gas, the fuel gas, and the coolant flow in the direction indicated by the arrow A.

The oxygen-containing gas flows from the oxygen-containing gas supply passage 26a into the oxygen-containing gas flow field 42 of the second metal separator 24 for inducing an electrochemical reaction at the cathode 36 of the membrane electrode assembly 20. The fuel gas flows from the fuel gas supply passage 30a into the fuel gas flow field 38 of the first metal separator 22. The fuel gas flows along the anode 34 of the membrane electrode assembly 20 for inducing an electrochemical reaction at the anode 34.

Thus, in each of the membrane electrode assemblies 20, the oxygen-containing gas supplied to the cathode 36, and the fuel gas supplied to the anode 34 are consumed in the electrochemical reactions at catalyst layers of the cathode 36 and the anode 34 for generating electricity.

After the oxygen-containing gas is consumed at the cathode 36, the oxygen-containing gas flows into the oxygen-containing gas discharge passage 26b. Likewise, after the fuel gas is consumed at the anode 34, the fuel gas flows into the fuel gas discharge passage 30b.

The coolant flows from the coolant supply passage 28a into the coolant flow field 40 between the first and second metal separators 22, 24, and flows in the direction indicated by the arrow B. After the coolant is used for cooling the membrane electrode assembly 20, the coolant flows into the coolant discharge passage 28b, and is discharged from the fuel cell 10.

In the embodiment, as shown in FIG. 3, the first and second ribs 48, 50 are provided on the metal plates 23, 25 around the oxygen-containing gas supply passage 26a or the like. The rib surfaces 48a, 50a are spaced inwardly from the inner end surfaces 23a, 25a of the metal plates 23, 25, toward inside of the oxygen-containing gas supply passage 26a or the like.

Thus, when the power generation cells 12 are stacked together, the first ribs 48 and the second ribs 50 do not sandwich the metal plates 23, 25 in the stacking direction. In the structure, the inner end surfaces 23a, 25a of the metal plates 23, 25 are not present within the rib width H1 as the width where the rib surfaces 48a, 50a contact. Thus, even if the seal height (in the stacking direction) of the ridge seal 52 of the first seal member 44 or the ridge seal 56 of the second seal member 46 is reduced, e.g., due to deterioration over time, when the first rib 48 and the second rib 50 are compressed in the stacking direction, it is possible to suitably prevent the line pressure applied to the first rib 48 and the second rib 50 from being increased. It is because the compression ratios of the first rib 48 and the second rib 50 become small.

Thus, the line pressure applied to the first seal member 44 and the second seal member 46 for sealing are not reduced, and the desired performance for sealing the oxygen-containing gas supply passage 26a or the like is maintained, and the first seal member 44 and the second seal member 46 can be used suitably for a long period of time advantageously.

Further, in the embodiment, the first rib 48 is formed on the first seal member 44, only on the side where the ridge seal 52 is provided, and the first rib 48 is not present on the side where the planar seal 54 is provided. Likewise, the second rib 50 is formed on the second seal member 46, only on the side where the ridge seal 56 is provided, and the second rib 50 is not present on the side where the planar seal 58 is provided.

Thus, as shown in FIG. 4, for example, when a positional displacement as indicated by an arrow occurs in the first metal separator 22, the planar seal 54 of the first seal member 44 provided on the first metal separator 22 slides along the ridge seal 56 of the second seal member 46 provided on the adjacent second metal separator 24. Thus, the desired sealing performance by the first seal member 44 and the second seal member 46 is suitably maintained advantageously.

For example, assuming that the first rib 48b is formed also on the side where the planar seal 54 of the first seal member 44 is provided, if the positional displacement as indicated by the arrow occurs in the first metal separator 22, the first rib 48b contacts the ridge seal 56 of the adjacent second seal member 46. Thus, the first rib 48b may ride on the ridge seal 56, and the sealing performance of the first seal member 44 and the second seal member 46 may be degraded undesirably.

Thus, in the embodiment, the first rib 48 is provided only on the side where the ridge seal 52 of the first seal member 44 is provided, and the second rib 50 is provided only on the side where the ridge seal 56 of the second seal member 46 is provided. In the structure, even if a positional displacement occurs in the first metal separator 22 or the second metal separator 24, it is possible to maintain the desired sealing performance.

Further, in the embodiment, the rib surface 48a of the first rib 48 of the first metal separator 22 contacts the planar surface of the second rib 50 of the second metal separator 24 adjacent to the first metal separator 22 in the stacking direction, and the rib surface 50a of the second rib 50 contacts the planar surface of the adjacent first rib 48. In the structure, even if a positional displacement occurs in the rib surface 48*a* or the rib surface 50*a*, the rib surfaces 48*a*, 50*a* reliably contact the planar surfaces, respectively.

Further, in the embodiment, the inner wall surface 48*c* of the first rib 48 forming the oxygen-containing gas supply passage 26*a* or the like is contiguous with the inner wall surface 50*c* of the adjacent second rib 50 forming the oxygen-containing gas supply passage 26*a* or the like, and these inner surfaces form the flat surface. Thus, no step is present in the oxygen-containing gas supply passage 26*a* or the like, and reduction in the pressure loss is achieved effectively.

While the invention has been particularly shown and described with reference to a preferred embodiment, it will be understood that variations and modifications can be effected thereto by those skilled in the art without departing from the scope of the invention as defined by the appended claims.

What is claimed is:

1. A fuel cell formed by stacking an electrolyte electrode assembly and a first separator in a stacking direction, said electrolyte electrode assembly including a pair of electrodes and an electrolyte interposed between said electrodes, a passage extending through said first separator for allowing at least a reactant gas or a coolant to flow in the stacking direction, said first separator comprising a metal plate with a seal member integrally formed on both surfaces of an outer edge of said metal plate, a first rib having a frame shape being provided on said metal plate around said passage, wherein said first rib has a rib surface which extends in a direction perpendicular to the stacking direction, at least a part of the rib surface being in contact with a second rib on a second separator adjacent to said first separator in the stacking direction, the part of the rib surface that is in contact with the second rib having a first end that is nearest to the passage and a second end that is spaced away from an inner end surface of said metal plate around said passage, toward said passage.

2. A fuel cell according to claim 1, wherein said seal member includes a ridge seal at least at a position around said passage, said ridge seal protruding toward another seal member adjacent to said seal member in the stacking direction, and said first rib is provided on said metal plate only on a side where said ridge seal is provided.

3. A fuel cell according to claim 1, wherein said first rib is formed integrally with said seal member on said metal plate.

4. A fuel cell according to claim 1, wherein an inner wall surface of said first rib forming said passage is contiguous with an inner wall surface of an adjacent rib, and said inner wall surfaces form a flat surface.

5. A fuel cell according to claim 1, wherein said first rib has said rib surface protruding in the stacking direction, and a planar surface on a side opposite to the rib surface, and said rib surface of one of adjacent ribs contacts the planar surface of the other of the adjacent ribs.

* * * * *